United States Patent
Godoroja et al.

[11] Patent Number: 6,032,258
[45] Date of Patent: Feb. 29, 2000

[54] APPARATUS AND METHODS FOR TRANSMISSION SECURITY IN A COMPUTER NETWORK

[75] Inventors: Andrei Godoroja, North Vancouver; Glenn S. Fawcett, Vancouver; Joseph P. R. Tosey, Burnaby, all of Canada

[73] Assignee: Glenayre Electronics, Inc., Charlotte, N.C.

[21] Appl. No.: 08/893,529

[22] Filed: Jul. 11, 1997

Related U.S. Application Data

[60] Provisional application No. 60/022,045, Jul. 22, 1996, and provisional application No. 60/021,617, Jul. 12, 1996.

[51] Int. Cl.[7] ................................................. H04L 12/28
[52] U.S. Cl. ..................... 713/201; 713/200; 713/160; 713/178; 380/36; 380/278; 380/283
[58] Field of Search ................................. 713/160, 161, 713/178, 171, 200, 201; 380/36, 278, 283

[56] References Cited

U.S. PATENT DOCUMENTS

| | | |
|---|---|---|
| 4,023,163 | 5/1977 | Krishnaiyer et al. . |
| 5,058,161 | 10/1991 | Weiss . |
| 5,079,767 | 1/1992 | Perlman . |
| 5,081,678 | 1/1992 | Kaufman et al. . |
| 5,113,499 | 5/1992 | Ankney et al. . |
| 5,175,765 | 12/1992 | Perlman . |
| 5,428,645 | 6/1995 | Dolev et al. . |
| 5,455,865 | 10/1995 | Perlman . |
| 5,577,122 | 11/1996 | Schipper et al. ............... 380/28 |
| 5,613,012 | 3/1997 | Hoffman et al. ............... 382/115 |
| 5,778,068 | 7/1998 | Johnson et al. ............... 380/25 |
| 5,815,577 | 9/1998 | Clark ............... 380/52 |
| 5,872,849 | 2/1999 | Sudia ............... 380/49 |

*Primary Examiner*—Thomas R. Peeso
*Attorney, Agent, or Firm*—Christensen O'Connor Johnson & Kindness PLLC

[57] ABSTRACT

A method for validating a message packet communicated from a source node to a destination node in a computer network is disclosed. The source node and destination node have access to a clock mechanism synchronized with a common time frame. The method comprises generating a first security key using a time reference obtained from the clock mechanism and a password known by the source node and destination node, communicating the first security key with a message packet from the source node to the destination node, and when the first security key and message packet are received by the destination node, generating a second security key using the password and the time reference and comparing the second security key with the first security key. The message packet is discarded if the second security key does not correspond with the first security key.

In another aspect of the invention, the method further comprises communicating a first time reference obtained from the clock mechanism with a message packet, and when the first time reference and message packet are received by the destination node, comparing the first time reference with a second time reference obtained from the clock mechanism. The message packet is discarded if the time difference between the first time reference and the second time reference is greater than a predetermined amount of time. The predetermined amount of time may be based on a calculated normal packet transmission delay.

14 Claims, 1 Drawing Sheet

6,032,258

APPARATUS AND METHODS FOR TRANSMISSION SECURITY IN A COMPUTER NETWORK

RELATED APPLICATIONS

The benefit of the filing date of provisional application Ser. No. 60/022,045, filed on Jul. 22, 1996, and provisional application Ser. No. 60/021,617, filed on Jul. 12, 1996, is hereby claimed for this application under 35 U.S.C. §119(e).

FIELD OF THE INVENTION

This invention relates to message transmission security in computer networks, and more particularly to apparatus and methods for validating message transmissions communicated in a computer network.

BACKGROUND OF THE INVENTION

Computer networks are configurable according to several different models. In one model, a computer network has a plurality of communicatively interconnected components, or nodes, that are each capable of sending and receiving messages from one another. Such messages include information requests and/or data. Each component acts as a server and a client with respect to the other components.

The components may be fully interconnected such that each component has communication connections with all of the other components. A computer network of this design is particularly suited for using a multicast transmission protocol. In a multicast transmission protocol, message transmissions sourced by one node are communicated through the network to all other nodes.

Under certain undesirable circumstances, a node in a computer network may malfunction and erroneously fill the computer network communication channels with invalid or improper message transmissions. In other circumstances, a computer network's communication channels may be flooded with invalid or improper message transmissions originating from a hostile source outside the computer network. In either set of circumstances, a computer network typically acknowledges and attempts to process each message transmission as if it were valid. Considerable processing time and resources are wasted before the computer network discovers, if ever, the erroneous nature of the transmissions. Consequently, invalid message transmissions unnecessarily burden the processing resources of a computer network. This problem is magnified when a computer network uses a multicast transmission protocol because each node in such a computer network is individually burdened by processing the invalid transmissions.

Some systems attempt to address these problems by including a special code in each message transmission. The code is designed to verify that the message was generated by a valid node. However, hostile nodes analyzing valid message transmissions may identify the code portion of the message and simply copy the code into an invalid message, thus giving the message an appearance of validity. The invalid messages continue to present an unnecessary burden on the computer network's processing resources.

SUMMARY OF THE INVENTION

Accordingly, the present invention is a computer network and method that enables network components to efficiently make a determination regarding the validity of transmissions communicated over the network.

The computer network is comprised of a plurality of communicatively interconnected components. Abstract entities called "nodes" operate to represent the components in the network. The components identify and communicate with one another through their respective abstract nodes.

In the invention, message transmissions, or packets, transmitted from one node to another include a header and a body. The body of the packet includes data and/or information requests. The header includes addressing information, security and time codes, and other information relevant to the packet transmission. A portion of the packet header is reserved for storing a time reference indicative of the time at which the particular packet originated. Another portion of the packet header is reserved for storing a unique security key generated by an algorithm that combines a known password with the stored time reference.

When a node receives a packet encoded in accordance with the invention, the receiving node reads the time reference stored in the packet header and compares it against a present time reference. If the comparison indicates that the packet is "old," i.e., the time of origination stored in the packet header is outside of a predetermined window of acceptable time, the entire packet is presumed invalid and is immediately discarded. The receiving node also independently generates a security key from the known password and the stored time reference. The generated key is compared with the security key stored in the packet header. If the two keys do not correspond, the entire packet is presumed invalid and is immediately discarded. Thus, the invention preserves node processing capacity for otherwise valid tasks.

Preferably, discarded packets are logged to indicate configuration or security problems to the network operator.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
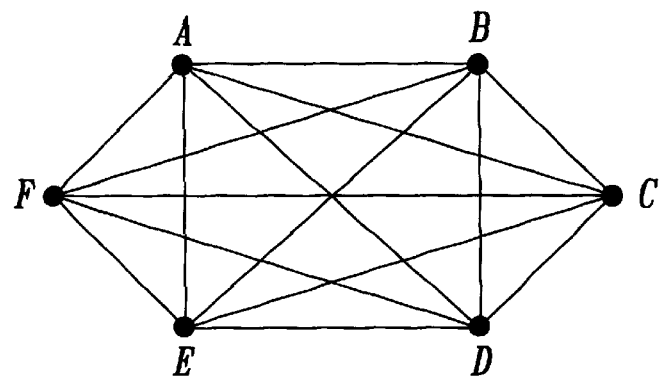
FIG. 1 is a graph illustrating a computer network suitable for the present invention.

A computer network suitable to employ the present invention is illustrated in FIG. 1. In FIG. 1, network components represented by nodes A, B, C, D, E and F all have communication links to one another. The communication links are illustrated as lines extending from each node to the other remaining nodes. Each node is capable of sending and receiving messages to and from any of the other nodes.

The network components represented by nodes A, B, C, D, E and F may be independent, standalone computers or may form part of other larger computing devices. Each node has computing capacity to formulate and send message transmissions, or packets, to other nodes. Each node also has computing capacity to receive and process packets from the other nodes. A computer network of such design is known and can be readily constructed by persons of ordinary skill in the computer network art.

Figure 2:
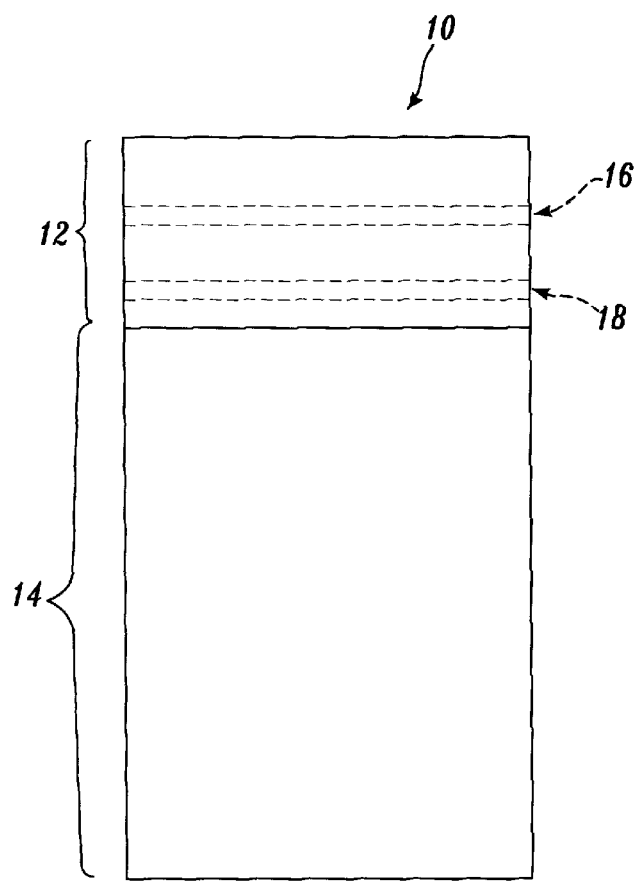
FIG. 2 illustrates a message packet with a header and body.

Referring to FIG. 2, a message packet 10 transmitted from a source node to a destination node has a header 12 and a body 14. The body 14 may include data, information requests, or portions thereof. The header 12 includes information relevant to the transmission and security of the message packet. This information includes addressing information (e.g., an identification of the source and destination node), optional security fields, and indications of the amount of data communicated by the packet. A portion 16 of the header 12 is reserved for storing a time reference indicative of the time at which the particular packet originated. Also reserved is a portion 18 for storing a security key. As described in greater detail below, the time reference and the security key stored in a packet header is used by the node receiving the packet to determine the validity of the packet transmission.

Each of the nodes shown in FIG. 1 has access to a clock mechanism (not shown) that maintains a time reference. A clock mechanism may be resident in each individual network component. Alternatively, the network components may have access to a central clock mechanism. In any event, it is essential that the network components share reference to a common time frame.

In the event that each individual component has its own resident clock mechanism, each clock mechanism is synchronized with a common time frame. While it is preferable that the synchronization be exact, for purposes of the present invention, a certain amount of time difference may be tolerated. For example, it may be sufficient that all of the nodes are synchronized within two minutes to the same time reference (that is, plus or minus one minute).

Each of the nodes shown in FIG. 1 also has access to one or more passwords to be used in communicating with the other nodes. In one embodiment of the invention, a single password is used by all nodes in a network belonging to one carrier or organization. In the case where several organizations exchange data on the same network, a different password is provided to each of the several organizations. In this manner, each node will use one password for communication to other commonly owned nodes, and other passwords for communication with nodes belonging to other organizations that access the network.

To assist in establishing packet security, when generating a message packet, a node references its clock mechanism and obtains a present time reference. This time reference is recorded in the time portion 16 of the header 12. Although many different time formats are suitable for the invention, a preferred embodiment of the invention uses a UNIX time format. A 32-bit Internet time format is also suitable.

Packet security is further established by generating and including a security key in the key portion 18 of the message packet header 12. According to a preferred embodiment of the invention, a node uses a predetermined key-generating algorithm to generate a unique security key for each packet. The key-generating algorithm combines a known password with the present time reference recorded in the time portion 16 of the header 12. Other variables as well, including the source and destination node identifiers, packet length information, sequence numbers, and actual data communicated by the packet, may be used in generating the unique security key. The key-generating algorithm may use conventional encoding techniques (e.g., performing addition, subtraction, multiplication, division, raising to a power, calculating a root, performing logic comparisons, etc.) using the password, time reference information, and other variables, if applicable, along with randomly-selected numbers, as operands, to generate a security key in a manner which is difficult to reverse. Providing computer software routines that perform such encoding techniques is readily within the ordinary skill of one involved in the computer programming art.

In a preferred embodiment of the invention, the following routine is used to generate a security key. Variable "in" is an array of values that includes the password and the time reference recorded in the packet header. Variable "out" is the security key sent with the packet.

```
void security_key_hash (
unsigned long in[12],
unsigned long out[2])
{
    unsigned long ex[72];
    unsigned long r0, r1, r2, r3, r4, r5;
    unsigned int i;
    for (i = 0; i < 72; i++)
    ex[i] = 0;
    for (i = 0; i < 12; i++)
    ex[i] = in[i];
    for ( ; i < 72; i++)
    ex[i] = ex[i - 3]  ^  ex[i - 5]  ^  ex[i - 6]  ^  ex[i - 12];
    r0 = 3822118087L;
    r1 = 4206368529L;
    r2 = 2636563960L;
    r3 = 1419098426L;
    r4 = 7425542111L;
    for (i = 0; i < 72; i++) {
    switch (i / 18) {
        case 0:
            r3) | (r2 & r3)) +
    (r4 << 11) + (r4 >> 21) + 2049053871L;
    break;
        case 1:
            & r3)) +
    (r4 << 11) + (r4 >> 21) + 909867182L;
    break;
        case 2:
            (~r1 & ~(r2 & r3))) +
    (r4 << 11) + (r4 >> 21) + 2073245137L;
    break;
        case 3:
            (~r1 & ~r2)) +
    (r4 << 11) + (r4 >> 21) + 4157358317L;
    break;
    }
    r0 = r1;
    r1 = r2;
    r2 = (r3 << 27) + (r3 >> 5);
    r3 = r4;
    r4 = r5;
    out[0] = r0 + (r2 * 2628165923L) + (r4 * 545239213L);
    out[1] = r1 + (r3 * 68740181L);
    }
}
```

A formulated packet with a complete header and body is transmitted over the computer network to a destination node. Before processing a received message packet, the destination node verifies the validity of the packet. In terms of the present invention, packet validity is determined by inspection of the time reference and the security key stored in the packet header. Accordingly, in one aspect, the destination node references a clock mechanism to obtain a present time reference. The destination node compares the present time reference with the time reference recorded in the packet header. In this manner, the time stored in the packet header is used in determining the "age" of the packet.

Preferably, the node accomplishes the comparison step by subtracting the time reference in the header from the present time reference. The result is a time differential reflecting the time difference between origination of the packet at its source to reception of the packet at its destination.

According to a preferred embodiment of the invention, a predetermined amount of time is allotted for normal packet transmission delay. If the time differential resulting from the comparison step is greater than the allotted time for normal packet transmission, the packet is presumed to be invalid and is immediately removed from further consideration. The destination node discards, ignores, erases, or otherwise denies the packet further consideration.

In an alternative embodiment, the destination node may accomplish the comparison step by first obtaining a present time reference and then subtracting a predetermined amount of time from that time reference. If the time reference recorded in the message packet is earlier than the time reference resulting from the subtraction step, the packet is presumed to be "old" and therefore invalid. Because "old" message packets do not receive further consideration, processing resources of the computer network are conserved.

In another aspect of the invention, packet validity is established by inspection of the security key stored in the packet header. The destination node uses the password associated with the packet transmission and the time reference representing when the packet originated, along with other variables, if applicable, in a key-generating algorithm to generate a security key that should correspond with the key stored in the packet header. If the generated security key does not correspond with the security key recorded in the packet header, it is presumed that the source node does not know the password, does not know the time, or does not have a proper key-generating routine. The packet is presumed to be invalid and is immediately removed from further consideration. As described above, the destination node discards, ignores, erases, or otherwise denies the packet further consideration.

The invention provides a solution for situations in which a valid network node malfunctions or otherwise becomes hostile to the operation of the network and floods the network communication channels with duplicate, out-of-date messages. Rather than requiring network components to process such invalid messages, a computer network constructed in accordance with the invention uses a time-based mechanism to determine the age of the message. When a node malfunctions and floods a computer network with multiple copies of the same message, after a predetermined amount of time, the time information recorded in the message header will indicate that the message is "old" and presumably invalid. The invalid messages are ignored, thus preserving valuable processing time of network components for otherwise valid tasks. The time savings is multiplied in computer networks that use broadcast communication, such as networks using a multicast transmission protocol. The invention thus reduces the overall processing burdens on a computer network.

Figure 3:
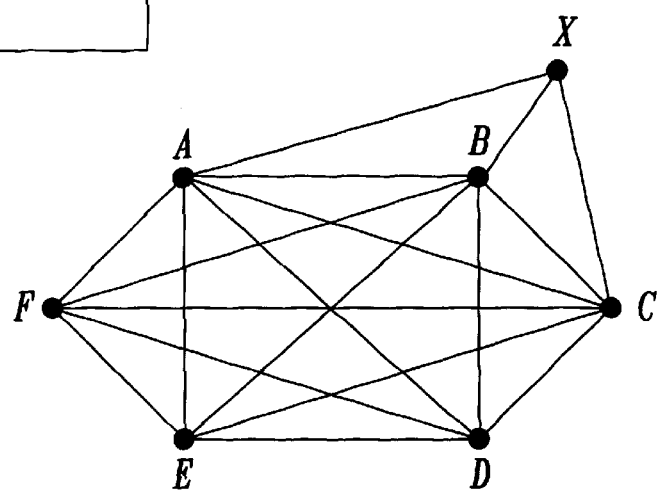
FIG. 3 is a graph illustrating a computer network with which an external node has established connections.

The invention also provides a solution for situations in which a node outside of the computer network obtains communication access to the network. For example, in FIG. 3, node X is shown as having obtained communication access to the network through nodes A, B, and C. Node X may be hostile to the normal operation of the network and flood the network's communication channels with invalid messages. Messages originated by hostile node X will likely lack a proper time reference in the message header, or will lack a time reference synchronized with the clock mechanisms of the network. For computer networks using the invention, the invalidity of the messages will be quickly determined because the time information in the messages will not be within the acceptable time window established by the network.

As described earlier, a computer network constructed in accordance with the invention also uses a key-based mechanism to determine the validity of a message transmission. A security key included with a message transmission is generated by a unique combination of a password, a time reference, and other variables as applicable. In situations where hostile node X, as described above, has communication access to the network, messages originated by hostile node X will likely lack a proper security key in the message header. As noted, a proper security key requires knowledge of a password, a time reference, and a other variables as applicable. In the event that hostile node X succeeds in including a proper time reference, hostile node X will likely be unable to include a proper security key unless the hostile node also has access to the proper password, the other variables, and the proper security key-generating algorithm. In this manner, the invention links a password with a time reference to provide a security key for establishing and determining the validity of message transmissions communicated over a computer network.

The invention is particularly useful in computer networks that employ User Datagram Protocol (UDP) for communications control. UDP is a "connectionless" transport protocol and accordingly, nodes do not require specific connection establishment with other nodes to send a message. A connectionless environment is particularly susceptible to the situation described above where external hostile node X obtains access to the network. Once node X obtains access to the network, node X is capable of communicating invalid packets to any or all of the nodes in the computer network. The invention provides means for nodes in a computer network to determine the validity of message transmissions and exclude those transmissions that do not fit the proper criteria. If the receiving nodes find that the time reference or the security key is invalid in any packet, the nodes can assume that the sending node does not know the password or proper time reference and the packet is discarded. The chance that a hostile node can flood the computer network with invalid data, the possibility of which is increased when multicast protocols or UDP are used, accordingly is reduced.

While the preferred embodiment of the invention has been illustrated and described, it will be appreciated that various changes can be made therein without departing from the spirit and scope of the invention. For instance, while FIG. 1 shows a fully meshed connection-oriented network, it is appreciated that the present invention may be used with computer networks of other topologies and configurations for both point-to-point and broadcast-type transmission. Network configurations that appear as a ring, a star, or a line are commonly known and are suitable for carrying out the invention.

The embodiments of the invention in which an exclusive property or privilege is claimed are defined as follows:

1. A method for validating a message packet communicated from a source node to a destination node in a computer network, the source node and destination node having access to a clock mechanism synchronized with a common time frame, the method comprising:

(a) generating a first security key using a time reference obtained from said clock mechanism and a password known by said source node and said destination node;

(b) communicating said first security key with a message packet from said source node to said destination node;

(c) when said first security key and said message packet are received by said destination node, generating a second security key using said password and said time reference and comparing said second security key with said first security key; and (d) discarding said message packet if said second security key does not correspond with said first security key.

2. A method for validating a message packet according to claim 1, wherein generating said first security key and said second security key further uses information selected from a group consisting of node identifiers, packet length information, sequence numbers, actual packet data, and randomly selected numbers.

3. A method for validating a message packet according to claim 1, wherein said message packet is comprised of a header and a body, and wherein said first security key is stored in said message packet header.

4. A method for validating a message packet according to claim 1, further comprising logging information regarding said message packet if said message packet is discarded.

5. A method for validating a message packet according to claim 1, further comprising:

(a) communicating a first time reference obtained from said clock mechanism with said message packet;

(b) when said first time reference and said message packet are received by said destination node, comparing said first time reference with a second time reference obtained from said clock mechanism; and (c) discarding said message packet if the difference in time between said first time reference and said second time reference is greater than a predetermined amount of time.

6. A method for validating a message packet according to claim 5, wherein said message packet has a header and a body, and wherein said first time reference is recorded in said message packet header.

7. A method for validating a message packet according to claim 5, wherein said predetermined amount of time is based on a calculated normal packet transmission delay.

8. A method for validating a message packet according to claim 5, wherein said first time reference and said second time reference use a UNIX time format.

9. A computer network comprising a plurality of communicatively interconnected components represented by nodes, wherein a message packet communicated from a source node to a destination node includes a first security key generated using a password and a time reference, and wherein said destination node generates a second security key using said password and said time reference and compares said second security key with said first security key, said destination node discarding the message packet if said second security key does not correspond with said first security key.

10. A computer network according to claim 9, wherein the generation of said first security key and said second security key further uses information selected from a group consisting of node identifiers, packet length information, sequence numbers, actual packet data, and randomly selected numbers.

11. A computer network according to claim 9, further comprising a log for recording information regarding said message packet if said message packet is discarded.

12. A computer network according to claim 3, wherein said message packet includes a first time reference, wherein said destination node compares said first time reference with a second time reference, and wherein said message packet is discarded if the difference in time between the first and second time references is greater than a predetermined amount of time.

13. A computer network according to claim 12, wherein said predetermined amount of time is based on a calculated normal packet transmission delay.

14. A computer network according to claim 12, wherein said first time reference and said second time reference use a UNIX time format.

\* \* \* \* \*